(12) United States Patent
Huang et al.

(10) Patent No.: US 8,603,367 B2
(45) Date of Patent: Dec. 10, 2013

(54) MANGANESE PHOSPHATES AND RELATED ELECTRODE ACTIVE MATERIALS

(75) Inventors: Haitao Huang, Henderson, NV (US); Yazid Saidi, Austin, TX (US)

(73) Assignee: Valence Technology, Inc., Las Vegas, NV (US)

( * ) Notice: Subject to any disclaimer, the term of this patent is extended or adjusted under 35 U.S.C. 154(b) by 372 days.

(21) Appl. No.: 12/887,630

(22) Filed: Sep. 22, 2010

(65) Prior Publication Data

US 2011/0068296 A1  Mar. 24, 2011

Related U.S. Application Data

(60) Provisional application No. 61/245,504, filed on Sep. 24, 2009.

(51) Int. Cl.
*H01M 4/58* (2010.01)
*H01B 1/02* (2006.01)

(52) U.S. Cl.
USPC .............. 252/519.14; 252/519.1; 252/519.15; 252/520.4; 252/521.2; 252/521.4; 252/521.5; 429/231.9; 429/231.95; 429/231.5; 429/224; 429/221; 423/306

(58) Field of Classification Search
USPC ................. 252/519.1, 519.14, 519.15, 520.4, 252/521.2, 521.4; 429/231.9, 231.95, 429/231.5, 221, 224; 423/306
See application file for complete search history.

(56) References Cited

U.S. PATENT DOCUMENTS

| | | | |
|---|---|---|---|
| 6,720,113 B2* | 4/2004 | Goto et al. | 429/231.95 |
| 6,749,967 B2* | 6/2004 | Li et al. | 429/231.95 |
| 7,029,795 B2* | 4/2006 | Li | 429/231.95 |
| 7,060,238 B2* | 6/2006 | Saidi et al. | 423/306 |
| 2002/0192553 A1* | 12/2002 | Barker et al. | 429/224 |
| 2003/0170542 A1* | 9/2003 | Barker et al. | 429/231.9 |
| 2004/0151649 A1* | 8/2004 | Hemmer et al. | 423/306 |
| 2007/0166617 A1* | 7/2007 | Gozdz et al. | 429/231.95 |
| 2009/0186277 A1* | 7/2009 | Beck et al. | 429/221 |
| 2010/0148114 A1* | 6/2010 | Iizuka et al. | 252/182.1 |

FOREIGN PATENT DOCUMENTS

WO  WO97/40541 A1  10/1997

* cited by examiner

*Primary Examiner* — Joseph D Anthony
(74) *Attorney, Agent, or Firm* — Cynthia S. Kovacevic; Brian T. Mangum; Roger A. Williams

(57) ABSTRACT

The invention provides electrode active materials comprising lithium or other alkali metals, manganese, a +3 oxidation state metal ion, and optionally other metals, and a phosphate moiety. Such electrode active materials include those of the formula:

$$A_a Mn_b MI_c MII_d MIII_e PO_4$$

wherein (a) A is selected from the group consisting of Li, Na, K, and mixtures thereof, and $0 < a \leq 1$;

(b) $0 < b \leq 1$;

(c) MI is a metal ion in the +3 oxidation state, and $0 < c < 0.5$;

(d) MII is metal ion, a transition metal ion, a non-transition metal ion or mixtures thereof, and $0 \leq d < 1$;

(e) MIII is a metal ion in the +1 oxidation state and $0 < e < 0.5$; and wherein A, Mn, MI, MII, MIII, $PO_4$, a, b, c, d and e are selected so as to maintain electroneutrality of said compound.

2 Claims, 4 Drawing Sheets

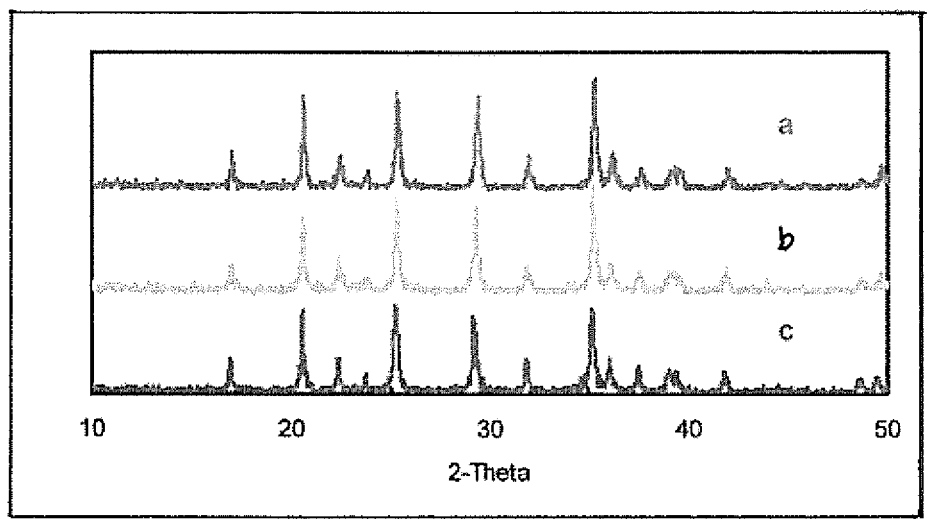
Fig 2. X-ray diffraction patterns of Examples 1= (c), 2 =(b) and 3 = (a) (Cu target)

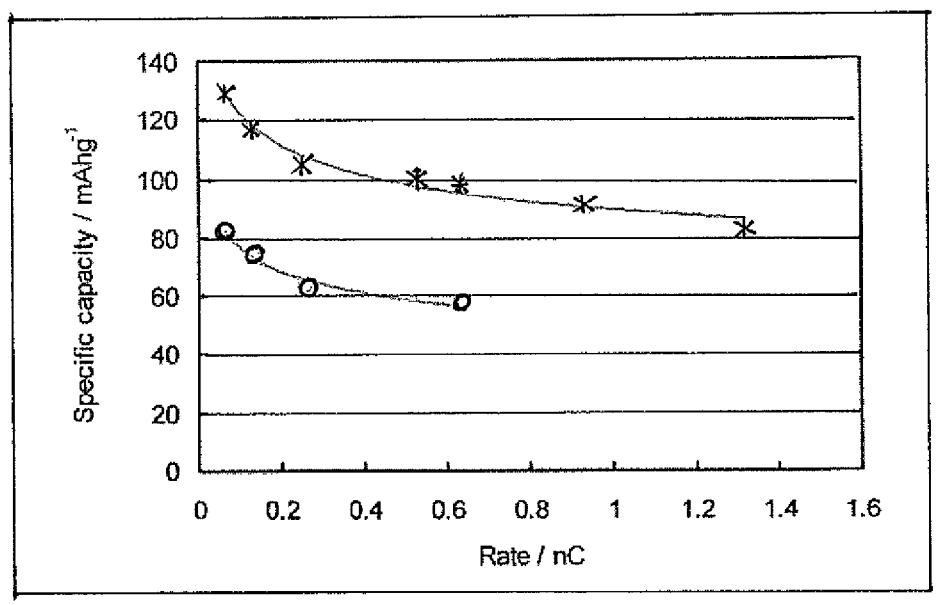
Fig 3. Capacities of Li cells for Examples 1 = (O) and 2 = (✶) are plotted against rates. For each rate charge current was same as discharge current. (Rate is calculated based on 150mAh/g of capacity).

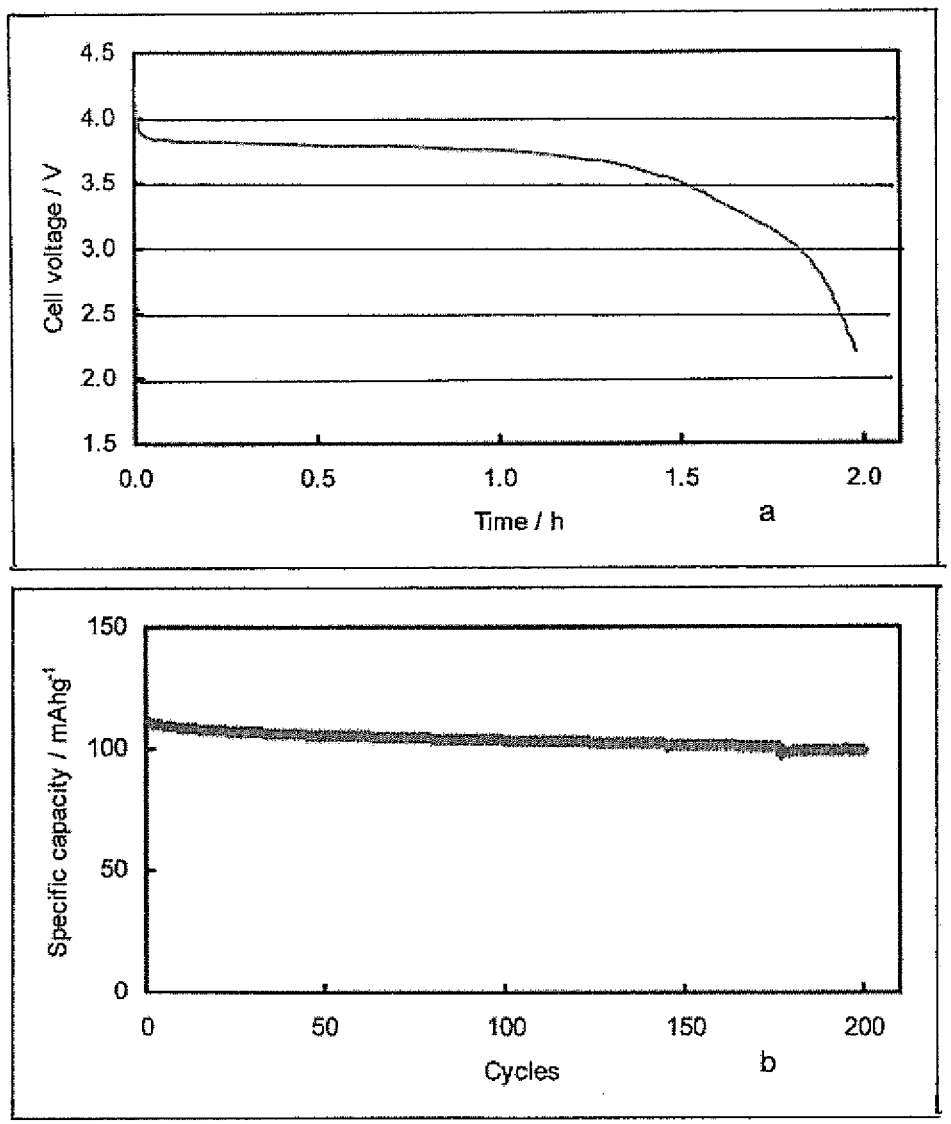
Fig 4. Discharge curve (a) and variation of capacity with cycles (b) for a Li-ion cell using Example 3 as cathode active material

MANGANESE PHOSPHATES AND RELATED ELECTRODE ACTIVE MATERIALS

This application claims priority from U.S. Ser. No. 61/245,504, filed Sep. 24, 2009.

FIELD OF THE INVENTION

This invention relates to electrochemical cells using positive electrode active materials with increased performance. In particular, this invention relates to active materials comprising a phosphate compound containing lithium, manganese and other alkali metals, metals and transition metals.

BACKGROUND OF THE INVENTION

Batteries are devices that convert chemical energy into electrical energy, by means of an electrochemical oxidation-reduction reaction. Batteries are used in a wide variety of applications, particularly as a power source for devices that cannot practicably be powered by centralized power generation sources (e.g., by commercial power plants using utility transmission lines).

Batteries can be generally described as comprising three components: an anode that contains a material that is oxidized (yields electrons) during discharge of the battery (i.e., while it is providing power); a cathode that contains a material that is reduced (accepts electrons) during discharge of the battery; and an electrolyte that provides for transfer of ions between the cathode and anode. During discharge, the anode is the negative pole of the battery, and the cathode is the positive pole. Batteries can be more specifically characterized by the specific materials that make up each of these three components. Selection of these components can yield batteries having specific voltage and discharge characteristics that can be optimized for particular applications.

Batteries can also be generally categorized as being "primary," where the electrochemical reaction is essentially irreversible, so that the battery becomes unusable once discharged; and "secondary," where the electrochemical reaction is, at least in part, reversible so that the battery can be "recharged" and used more than once. Secondary batteries are increasingly used in many applications, because of their convenience (particularly in applications where replacing batteries can be difficult), reduced cost (by reducing the need for replacement), and environmental benefits (by reducing the waste from battery disposal).

There are a variety of secondary battery systems known in the art. Among the most common systems are lead-acid, nickel-cadmium, nickel-zinc, nickel-iron, silver oxide, nickel metal hydride, rechargeable zinc-manganese dioxide, zinc-bromide, metal-air, and lithium batteries. Systems containing lithium and sodium afford many potential benefits, because these metals are light in weight, while possessing high standard potentials. For a variety of reasons, lithium batteries are, in particular, commercially attractive because of their high energy density, higher cell voltages, and long shelf-life.

Lithium batteries are prepared from one or more lithium electrochemical cells containing electrochemically active (electroactive) materials. Among such batteries are those having metallic lithium anodes and metal chalcogenide (oxide) cathodes, typically referred to as "lithium metal" batteries. The electrolyte typically comprises a salt of lithium dissolved in one or more solvents, typically nonaqueous aprotic organic solvents. Other electrolytes are solid electrolytes (typically polymeric matrixes) that contain an ionic conductive medium (typically a lithium containing salt dissolved in organic solvents) in combination with a polymer that itself may be ionically conductive but electrically insulating.

Cells having a metallic lithium anode and metal chalcogenide cathode are charged in an initial condition. During discharge, lithium metal yields electrons to an external electrical circuit at the anode. Positively charged ions are created that pass through the electrolyte to the electrochemically active (electroactive) material of the cathode. The electrons from the anode pass through the external circuit, powering the device, and return to the cathode.

Another lithium battery uses an "insertion anode" rather than lithium metal, and is typically referred to as a "lithium ion" battery. Insertion or "intercalation" electrodes contain materials having a lattice structure into which an ion can be inserted and subsequently extracted. Rather than chemically altering the intercalation material, the ions slightly expand the internal lattice lengths of the compound without extensive bond breakage or atomic reorganization. Insertion anodes contain, for example, lithium metal chalcogenide, lithium metal oxide, or carbon materials such as coke and graphite. These negative electrodes are used with lithium-containing insertion cathodes. In their initial condition, the cells are not charged, since the anode does not contain a source of cations. Thus, before use, such cells must be charged in order to transfer cations (lithium) to the anode from the cathode. During discharge the lithium is then transferred from the anode back to the cathode. During subsequent recharge, the lithium is again transferred back to the anode where it reinserts. This back-and-forth transport of lithium ions (Li+) between the anode and cathode during charge and discharge cycles had led to these cells as being called "rocking chair" batteries.

A variety of materials have been suggested for use as cathode active materials in lithium batteries. Such materials include, for example, $MoS_2$, $MnO_2$, $TiS_2$, $NbSe_3$, $LiCoO_2$, $LiNiO_2$, $LiMn_2O_4$, $V_6O_{13}$, $V_2O_5$, $SO_2$, $CuCl_2$. Transition metal oxides, such as those of the general formula $Li_xM_2O_y$, are among those materials preferred in such batteries having intercalation electrodes. Other materials include lithium transition metal phosphates, such as $LiMnPO_4$, $LiFePO_4$, and $Li_3V_2(PO_4)_3$. Such materials having structures similar to olivine or NASICON materials are among those known in the art.

Preferably, such a cathode material exhibits a high free energy of reaction with lithium, is able to release and insert a large quantity of lithium, maintains its lattice structure upon insertion and extraction of lithium, allows rapid diffusion of lithium, affords good electrical conductivity, is not significantly soluble in the electrolyte system of the battery, and is readily and economically produced. However, many of the cathode materials known in the art lack one or more of these characteristics. As a result, for example, many such materials are not economical to produce, afford insufficient voltage, have insufficient charge capacity, or lose their ability to be recharged over multiple cycles.

SUMMARY OF THE INVENTION

The invention provides electrode active materials comprising lithium or other alkali metals, manganese, a +3 oxidation state metal ion, and optionally other metals, and a phosphate moiety. Such electrode active materials include those of the formula:

$$A_aMn_bMI_cMII_dMIII_ePO_4$$

wherein
(a) A is selected from the group consisting of Li, Na, K, and mixtures thereof, and $0 < a \leq 1$;

(b) 0<b≤1;

(c) MI is a metal ion in the +3 oxidation state, and 0<c<0.5;

(d) MII is metal ion, a transition metal ion, a non-transition metal ion or mixtures thereof, and 0≤d<1;

(e) MIII is a metal ion in the +1 oxidation state and 0≤e≤0.5; and wherein A, Mn, MI, MII, MIII, PO$_4$, a, b, c, d and e are selected so as to maintain electroneutrality of said compound.

It has been found that the electrode materials of this invention afford benefits over such materials as LiMnPO$_4$ and among those known in the art. Such benefits include increased capacity. Specific benefits and embodiments of the present invention are apparent from the detailed description set forth herein. It should be understood, however, that the detailed description and specific examples, while indicating embodiments among those preferred, are intended for purposes of illustration only and are not intended to limited the scope of the invention.

BRIEF DESCRIPTION OF THE DRAWINGS

FIG. 2 shows the results of an x-ray diffraction analysis of Examples 1 (c), 2 (b) and 3 (a).

FIG. 3 shows the specific capacities plotted against rates of Li cells using the materials of Examples 1 and 2.

FIG. 4 shows a discharge curve and a chart of variation of capacity for a lithium ion cell using the active material of Example 3 as the cathode.

DESCRIPTION OF THE INVENTION

Figure 1:
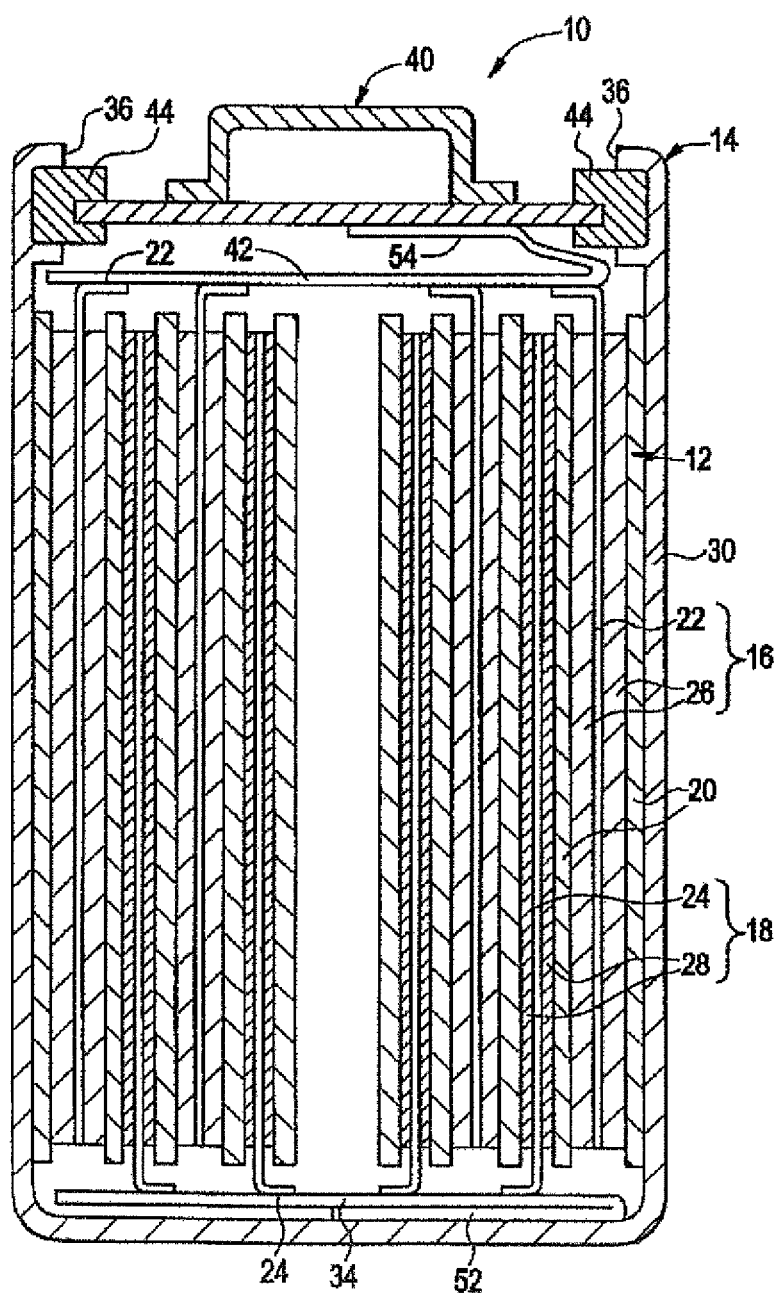
FIG. 1 is a schematic cross-sectional diagram illustrating the structure of a non-aqueous electrolyte cylindrical electrochemical cell of the present invention.

The present invention provides electrode active materials for use in a battery. As used herein, "battery" refers to a device comprising one or more electrochemical cells for the production of electricity. Each electrochemical cell comprises an anode, a cathode, and an electrolyte. Two or more electrochemical cells may be combined, or "stacked," so as to create a multi-cell battery having a voltage that is the sum of the voltages of the individual cells. The electrode active materials of this invention are used in the cathode of such electrochemical cells.

It has been proposed that LiMnPO$_4$, an olivine type phosphate compound containing manganese (Mn) which is an element with a high oxidation-reduction potential could be used as a positive electrode material. Theoretically, Mn based olivine phosphate, LiMnPO$_4$ is a 4V cathode material which is a higher operating voltage than the Fe based phosphate LiFePO$_4$. However, the Mn based phosphate has very poor electrochemical activity because of its low electronic and ionic conductivities. It has been found that LiMnPO$_4$ is an insulator material and that it therefore has low electrochemical activity. The present invention solves this problem by substituting other multiple metal cations in the olivine structure thereby impacting the material's performance and as a result the Mn based phosphate is capable of delivering significant capacity.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The present invention provides active materials (herein "electrode active materials") comprising lithium or other alkali metals, manganese, at least one metal in the +3 oxidation state, one metal in the +1 oxidation state and a phosphate moiety. Such electrode active materials include those of the formula A$_a$Mn$_b$MI$_c$MII$_d$MIII$_e$PO$_4$. (As used herein, the word "include," and its variants, is intended to be non-limiting, such that recitation of items in a list is not to the exclusion of other like items that may also be useful in the materials, compositions, devices, and methods of this invention.)

A is selected from the group consisting of Li (lithium), Na (sodium), K (potassium), and mixtures thereof. In a preferred embodiment, A is Li. In one embodiment, "a" is preferably from greater than about 0 to about 1, and more preferably from about 0.5 to about 1.

In a one embodiment, "b" is preferably from greater then about 0 to about 1, and more preferably from about 0.5 to about 1.

In one embodiment MI is a metal ion in the +3 oxidation state. Preferred metal ions include Al$^{3+}$, B$^{3+}$, V$^{3+}$ and the like. In one embodiment "c" is from greater than about 0 to about 0.5, and more preferably from greater than about 0 to about 0.25.

In one embodiment MII is a metal ion, transition metal ion, non-transition metal ion or mixtures thereof. Preferred metal ions include Fe$^{2+}$, Mg$^{2+}$, Co$^{2+}$, Ni$^{2+}$, Cu$^{2+}$, Ca$^{2+}$, Zn$^{2+}$ and the like. In one embodiment "d" is from about 0 to about 0.5, and more preferably from about 0 to about 0.25.

In one embodiment MIII is a metal ion in the +1 oxidation state. Preferred metal ions include Li$^+$ and the like. In one embodiment "e" is from greater than about 0 to about 0.5.

The composition of A, Mn, MI, MII, MIII, PO$_4$, and the values of a, b, c, d and e are selected so as to maintain electroneutrality of the electrode active material. As referred to herein "electroneutrality" is the state of the electrode active material wherein the sum of the positively charged species in the material is equal to the sum of the negatively charged species (in the material).

A preferred electrode active material embodiment comprises a compound of the formula

$$Li_aMn_bAl_cFe_dLi_ePO_4,$$

wherein

"a" is from greater than about 0 to about 1, "b" is from about 0.5 to about 1, "c" is from greater than about 0 to about 0.5, "d" is from about 0 to about 0.5 and "e" is from greater then about 0 to about 0.5. A more preferred embodiment is LiMn$_{0.8}$Fe$_{0.1}$Al$_{0.05}$Li$_{0.05}$PO$_4$.

Another preferred embodiment comprises a compound of the formula

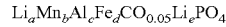

$$Li_aMn_bAl_cFe_dCO_{0.05}Li_ePO_4$$

wherein

"a" is from greater then about 0 to about 1, "b" is from about 0.5 to about 1, "c" is from greater then about 0 to about 0.5, "d" is from about 0 to about 0.5 and "e" is from greater then about 0 to about 0.5. A more preferred embodiment is LiMn$_{0.75}$Al$_{0.05}$Fe$_{0.1}$CO$_{0.05}$Li$_{0.05}$PO$_4$.

Methods of Manufacture:

Active materials of the invention are readily synthesized by reacting starting materials, with or without simultaneous oxidation or reduction of the metal species involved. In one aspect, according to the desired values of a, b, c, d and e in the product A$_a$Mn$_b$MI$_c$MII$_d$MIII$_e$PO$_4$, starting materials are chosen that contain "a" moles of alkali metal A from all sources, "b" moles of Mn from all sources, "c" moles of MI from all sources, "d" moles of MII from all sources, "e" moles of MIII from all sources and one mole of $PO_4$, again taking into account all sources. A particular starting material may be the source of more than one of the components.

It is preferred to synthesize the active materials of the invention using stoichiometric amounts of the starting materials, based on the desired composition of the reaction product. Alternatively, it is possible to run the reaction with a stoichiometric excess of one or more of the starting materials. In such a case, the stoichiometry of the product will be determined by the limiting reagent among the components. There will also be at least some unreacted starting material in the reaction product mixture. Because such impurities in the active materials are generally undesirable (with the exception carbon), it is generally preferred to provide relatively exact molar amounts of all the starting materials.

A starting material may provide more than one of the components of the final product. In various embodiments of the invention, starting materials are provided that combine, for example, the metal and the phosphate. In one embodiment, a starting material is provided that contains alkali metal, metal, and phosphate. As a general rule, there is flexibility to select starting materials containing any of the components of alkali metal A, metal ions, and phosphate, depending on availability. Combinations of starting materials providing each of the components may also be used.

Exemplary methods of making the electrode active materials of the formulas described above are set forth in the Examples that follow. Further methods of making such compounds are generally known in the art and described in the literature, and are also described in: WO 01/54212 to Barker et al., published Jul. 26, 2001; International Publication No. WO 98/12761 to Barker et al., published Mar. 26, 1998; WO 00/01024 to Barker et al., published Jan. 6, 2000; WO 00/31812 to Barker et al., published Jun. 2, 2000; WO 00/57505 to Barker et al., published Sep. 28, 2000; WO 02/44084 to Barker et al., published Jun. 6, 2002; WO 03/085757 to Saidi et al., published Oct. 16, 2003; WO 03/085771 to Saidi et al., published Oct. 16, 2003; WO 03/088383 to Saidi et al., published Oct. 23, 2003; U.S. Pat. No. 6,528,033 to Barker et al., issued Mar. 4, 2003; U.S. Pat. No. 6,387,568 to Barker et al., issued May 14, 2002; U.S. Publication No. 2003/0027049 to Barker et al., published Feb. 2, 2003; U.S. Publication No. 2002/0192553 to Barker et al., published Dec. 19, 2002; U.S. Publication No. 2003/0170542 to Barker at al., published Sep. 11, 2003; and U.S. Publication No. 2003/1029492 to Barker et al., published Jul. 10, 2003.

The present invention also provides electrodes comprising an electrode active material of the present invention. In a preferred embodiment, the electrodes of the present invention comprise an electrode active material of this invention, a binder; and an electrically conductive carbonaceous material.

In a preferred embodiment, the electrodes of this invention comprise:
(a) from about 25% to about 95%, more preferably from about 50% to about 90%, active material;
(b) from about 2% to about 95% electrically conductive material (e.g., carbon black); and
(c) from about 3% to about 20% binder chosen to hold all particulate materials in contact with one another without degrading ionic conductivity.

(Unless stated otherwise, all percentages herein are by weight.) Cathodes of this invention preferably comprise from about 50% to about 90% of active material, about 5% to about 30% of the electrically conductive material, and the balance comprising binder. Electrically conductive materials among those useful herein include carbon black, graphite, powdered nickel, metal particles, conductive polymers (e.g., characterized by a conjugated network of double bonds like polypyrrole and polyacetylene), and mixtures thereof. Binders useful herein preferably comprise a polymeric material and extractable plasticizer suitable for forming a bound porous composite. Preferred binders include halogenated hydrocarbon polymers (such as poly(vinylidene chloride) and poly((dichloro-1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, and mixtures thereof.

In a preferred process for making an electrode, the electrode active material is mixed into a slurry with a polymeric binder compound, a solvent, a plasticizer, and optionally the electroconductive material. The active material slurry is appropriately agitated, and then thinly applied to a substrate via a doctor blade. The substrate can be a removable substrate or a functional substrate, such as a current collector (for example, a metallic grid or mesh layer) attached to one side of the electrode film. In one embodiment, heat or radiation is applied to evaporate the solvent from the electrode film, leaving a solid residue. The electrode film is further consolidated, where heat and pressure are applied to the film to sinter and calendar it. In another embodiment, the film may be air-dried at moderate temperature to yield self-supporting films of copolymer composition. If the substrate is of a removable type it is removed from the electrode film, and further laminated to a current collector. With either type of substrate it may be necessary to extract the remaining plasticizer prior to incorporation into the battery cell.

Electrochemical cells:
The batteries of the present invention comprise:
(a) a first electrode comprising an active material of the present invention;
(b) a second electrode which is a counter-electrode to said first electrode; and
(c) an electrolyte between said electrodes.

The electrode active material of this invention preferably comprises the cathode.

The active material of the second, counter-electrode is any material compatible with the electrode active material of this invention. For instance the anode may comprise any of a variety of compatible anodic materials well known in the art, including lithium, lithium alloys, such as alloys of lithium with aluminum, mercury, manganese, iron, zinc, and intercalation based anodes such as those employing carbon, tungsten oxides, and mixtures thereof. In a preferred embodiment, the anode comprises:
(a) from about 0% to about 95%, preferably from about 25% to about 95%, more preferably from about 50% to about 90%, of an insertion material;
(b) from about 2% to about 95% electrically conductive material (e.g., carbon black); and
(c) from about 3% to about 20% binder chosen to hold all particulate materials in contact with one another without degrading ionic conductivity.

In a particularly preferred embodiment, the anode comprises from about 50% to about 90% of an insertion material selected from the group active material from the group consisting of metal oxides (particularly transition metal oxides), metal chalcogenides, and mixtures thereof. In another preferred embodiment, the anode does not contain an insertion active, but the electrically conductive material comprises an insertion matrix comprising carbon, graphite, cokes, mesocarbons and mixtures thereof.

The architecture of a battery is not limited to any particular architecture, and may be selected from the group consisting of cylindrical wound designs, z-fold designs, wound prismatic and flat-plate prismatic designs, and polymer laminate designs.

Referring to FIG. 1, in one embodiment the electrochemical cell (10) includes a spirally coiled or wound electrode assembly (12) enclosed in a sealed container, preferably a rigid cylindrical casing (14) as illustrated in FIG. 1. In one subembodiment, the cell (10) is a prismatic-type cell, and the casing has a substantially rectangular cross-section (not illustrated).

Referring again to FIG. 1, the electrode assembly (12) includes: a positive electrode (16) consisting of, among other things, an electrode active material represented by general formulas described above, a counter negative electrode (18); and a separator (20) interposed between the first and second electrodes (16), (18). The separator (20) is preferably an electrically insulating, ionically conductive microporous film, and is composed of a polymeric material selected from the group consisting of polyethylene, polyethylene oxide, polyacrylonitrile and polyvinylidene fluoride, polymethyl methacrylate, polysiloxane, copolymers thereof, and admixtures thereof.

Each electrode (16), (18) includes a current collector (22) and (24), respectively, for providing electrical communication between the electrodes (16), (18) and an external load. Each current collector (22), (24) is a foil or grid of an electrically conductive metal such as iron, copper, aluminum, titanium, nickel, stainless steel, or the like, having a thickness of between 5 μm and 100 μm, preferably 5 μm and 20 μm. Optionally, the current collector may be treated with an oxide-removing agent such as a mild acid and the like, and coated with an electrically conductive coating for inhibiting the formation of electrically insulating oxides on the surface of the current collector (22), (24). Examples of a suitable coatings include polymeric materials comprising a homogenously dispersed electrically conductive material (e.g. carbon), such polymeric materials including: acrylics including acrylic acid and methacrylic acids and esters, including poly(ethylene-co-acrylic acid); vinylic materials including poly(vinyl acetate) and poly(vinylidene fluoride-co-hexafluoropropylene); polyesters including poly(adipic acid-co-ethylene glycol); polyurethanes; fluoroelastomers; and mixtures thereof.

The positive electrode (16) further includes a positive electrode film (26) formed on at least one side of the positive electrode current collector (22), preferably both sides of the positive electrode current collector (22), each film (26) having a thickness of between 10 μm and 150 μm, preferably between 25 μm and 125 μm, in order to realize the optimal capacity for the cell (10). The positive electrode film (26) is composed of between 80% and 95% by weight of an electrode active material represented by general formulas described above, between 1% and 10% by weight binder, and between 1% and 10% by weight electrically conductive agent.

Suitable binders include: polyacrylic acid; carboxymethylcellulose; diacetylcellulose; hydroxypropylcellulose; polyethylene; polypropylene; ethylene-propylene-diene copolymer; polytetrafluoroethylene; polyvinylidene fluoride; styrene-butadiene rubber; tetrafluoroethylene-hexafluoropropylene copolymer; polyvinyl alcohol; polyvinyl chloride; polyvinyl pyrrolidone; tetrafluoroethylene-perfluoroalkylvinyl ether copolymer; vinylidene fluoride-hexafluoropropylene copolymer; vinylidene fluoride-chlorotrifluoroethylene copolymer; ethylenetetrafluoroethylene copolymer; polychlorotrifluoroethylene; vinylidene fluoride-pentafluoropropylene copolymer; propylene-tetrafluoroethylene copolymer; ethylene-chlorotrifluoroethylene copolymer; vinylidene fluoride-hexafluoropropylene-tetrafluoroethylene copolymer; vinylidene fluoride-perfluoromethylvinyl ether-tetrafluoroethylene copolymer; ethylene-acrylic acid copolymer; ethylene-methacrylic acid copolymer; ethylene-methyl acrylate copolymer; ethylene-methyl methacrylate copolymer; styrene-butadiene rubber; fluorinated rubber; polybutadiene; and admixtures thereof. Of these materials, most preferred are polyvinylidene fluoride and polytetrafluoroethylene.

Suitable electrically conductive agents include: natural graphite (e.g. flaky graphite, and the like); manufactured graphite; carbon blacks such as acetylene black, Ketzen black, channel black, furnace black, lamp black, thermal black, and the like; conductive fibers such as carbon fibers and metallic fibers; metal powders such as carbon fluoride, copper, nickel, and the like; and organic conductive materials such as polyphenylene derivatives.

The negative electrode (18) is formed of a negative electrode film (28) formed on at least one side of the negative electrode current collector (24), preferably both sides of the negative electrode current collector (24). In one subembodiment, the negative electrode is an alkali metal foil, such as a lithium metal foil. In another subembodiment, the negative electrode film (28) is composed of between 80% and 95% of an intercalation material, between 2% and 10% by weight binder, and (optionally) between 1% and 10% by of an weight electrically conductive agent.

Intercalation materials suitable herein include: transition metal oxides, metal chalcogenides, carbons or carbonaceous materials (e.g. graphite), and mixtures thereof. In one embodiment, the intercalation material is graphite.

Referring again to FIG. 1, The cylindrical casing (14) includes a cylindrical body member (30) having a closed end (32) in electrical communication with the negative electrode (18) via a negative electrode lead (34), and an open end defined by crimped edge (36). In operation, the cylindrical body member (30), and more particularly the closed end (32), is electrically conductive and provides electrical communication between the negative electrode (18) and an external load (not illustrated). An insulating member (38) is interposed between the spirally coiled or wound electrode assembly (12) and the closed end (32).

A positive terminal cap (40) in electrical communication with the positive electrode (16) via a positive electrode lead (42) provides electrical communication between the positive electrode (16) and the external load (not illustrated). A gasket member (44) sealingly engages the upper portion of the cylindrical body member (30) to the positive terminal cap (40).

A non-aqueous electrolyte (not shown) provides ionic communication between the positive electrode (16) and the negative electrode (18), by transferring ionic charge carriers between the positive electrode (16) and the negative electrode (18) during charge and discharge of the electrochemical cell (10). The electrolyte includes a non-aqueous solvent and an alkali metal salt dissolved therein. Suitable solvents include: a cyclic carbonate such as ethylene carbonate, propylene carbonate, butylene carbonate or vinylene carbonate; a non-cyclic carbonate such as dimethyl carbonate, diethyl carbonate, ethyl methyl carbonate or dipropyl carbonate; an aliphatic carboxylic acid ester such as methyl formate, methyl acetate, methyl propionate or ethyl propionate; a .gamma.-lactone such as γ-butyrolactone; a non-cyclic ether such as 1,2-dimethoxyethane, 1,2-diethoxyethane or ethoxymethoxyethane; a cyclic ether such as tetrahydrofuran or 2-methyltetrahydrofuran; an organic aprotic solvent such as dimethylsulfoxide, 1,3-dioxolane, formamide, acetamide, dimethylformamide, dioxolane, acetonitrile, propylnitrile, nitromethane, ethyl monoglyme, phospheric acid triester, trimethoxymethane, a dioxolane derivative, sulfolane, methylsulfolane, 1,3-dimethyl-2-imidazolidinone, 3-methyl-2-oxazolidinone a propylene carbonate derivative, a tetrahydrofuran derivative, ethyl ether, 1,3-propanesultone, anisole, dimethylsulfoxide and N-methylpyrrolidone; and mixtures thereof. A mixture of a cyclic carbonate and a non-cyclic carbonate or a mixture of a cyclic carbonate, a non-cyclic carbonate and an aliphatic carboxylic acid ester, are preferred.

Suitable alkali metal salts include: $LiClO_4$; $LiBF_4$; $LiPF_6$; $LiAlCl_4$; $LiSbF_6$; LiSCN; LiCl; $LiCF_3SO_3$; $LiCF_3CO_2$; $Li(CF_3SO_2)_2$; $LiAsF_6$; $LiN(CF_3SO_2)_2$; $LiB_{10}Cl_{10}$, lithium bis(oxalate)borate; a lithium lower aliphatic carboxylate; LiCl; LiBr; LiI; a chloroboran of lithium; lithium tetraphenylborate; lithium imides; sodium and potassium analogues of the aforementioned lithium salts; and mixtures thereof. Preferably, the electrolyte contains at least $LiPF_6$.

The following non-limiting examples illustrate the compositions and methods of the present invention.

EXAMPLE 1

$LiMnPO_4$—Comparative Material $Mn(CH_3COO)_2 4H_2O$ (5.0815 g, Aldrich 99%), $Li(CH_3COO)_2 H_2O$ (2.0835 g, Aldrich) and $NH_4H_2PO_4$ (2.3971 g, Alfa 98%) were mixed in water under stirring. This solution also contained glycolic acid (4.7064 g, Aldrich). Carbon black (0.1206 g) was added into this solution. After rotary evaporation for removal of water, the dried solid was ball milled for twenty hours and then fired at 575° C. for three hours under argon. The fired product was ball mailed for two hours and then re-fired at 575° C. for one and a half hours under argon.

a. X-ray diffraction confirmed that the product is olivine $LiMnPO_4$ (FIG. 2(c)) and carbon analysis indicated that the product contains 7.4% of residual carbon. Li cell testing results show that this $LiMnPO_4$ has a reversible capacity of 83 mAh/g at C/15 (see FIG. 3)

EXAMPLE 2

$LiMn_{0.8}Fe_{0.1}Al_{0.05}Li_{0.05}PO_4$

To prepare $LiMn_{0.8}Fe_{0.1}Al_{0.05}Li_{0.05}PO_4$, Fe powder (Aldrich 99.9%) was used as Fe source. Fe was first reacted with $CH_3COOH$ and was then completely dissolved in water. The resulting Fe solution, which was made of 0.1142 g of Fe, was mixed with another aqueous solution that contained $Mn(CH_3COO)_2 4H_2O$ (4.0652 g, Aldrich 99%), $Al(NO_3)_3 9H_2O$ (0.3909 g, Aldrich 98%), $Li_2CO_3$ (0.0381 g, Aldrich 99%), and glycolic acid (4.7064 g, Aldrich). $LiH_2PO_4$ (2.1439 g) was added into the solution under stirring, and carbon black (0.1134 g) was also added. After rotary evaporation for removal of water, the dried solid was ball milled for twenty hours and then fried at 600° C. for three hours. The fired product was ball milled for two hours and then re-fired at 675° C. for one and a half hours under argon.

The XRD pattern shows an olivine phase (see FIG. 2(b)) and carbon analysis indicated that the product contains 10.2% of residual carbon. In lithium cells, this Mn based phosphate material exhibits a reversible capacity as high as 130 mAh/g at C/15 (see FIG. 3).

EXAMPLE 3

$LiMn_{0.75}Fe_{0.1}CO_{0.05}Al_{0.05}Li_{0.05}PO_4$ $LiMn_{0.75}Fe_{0.1}CO_{0.05}Al_{0.05}Li_{0.05}PO_4$ was prepared in the way similar to Example 2. An Fe solution containing 0.1142 g of Fe was mixed with the solution that contained $Mn(CH_3COO)_2 4H_2O$ (3.8111 g, Aldrich 99%), $Co(CH_3COO)_2 4H_2O$ (0.2507 g, Alfa 24% of Co), $Al(NO_3)_3 9H_2O$ (0.3909 g, Aldrich 98%), $Li_2CO_3$ (0.0381 g, Aldrich 99%) and glycolic acid (4.7064 g). $LiH_2PO_4$ (2.1438 g) was added into the solution under stirring, and then carbon black (0.1179 g) was added into this solution. After rotary evaporation for removal of water, the dried solid was ball milled for twenty hours and then fired at 600° C. for three hours. The fired product was ball mailed for two hours and then re-fired at 675° C. for one and a half hours under argon.

X-ray diffraction shows an olivine pattern (see FIG. 2(a)) and carbon analysis indicated that the product contains 9.9% of residual carbon. A Li ion cell was constructed from this substituted $LiMnPO_4$ and the cathode active loading was high as 14 mg/cm². The cell was cycled at a rate of C/2, showing 110 mAh/g of initial capacity and 90% of capacity was retained after 200 cycles, see FIG. 4, which is very promising performance for practical use.

Li cell:

In a Li cell, one electrode was made from Mn based phosphate material and the other was a Li metal. Mn based phosphate electrode was prepared with 85 wt % of phosphate (including residual carbon), 5 wt % carbon black and 10 wt % of PVDF/HFP copolymer, mixing in acetone. The mixture slurry was coated on Al foil and after removal of acetone the electrode was compressed and punched as a disc with an area of 2.85 cm². The active material loading (excluding residual carbon) was 3.5-4 mg/cm². Glass-fiber was used as separator.

Li-Ion Cell:

In a Li ion cell, the cathode was Mn based phosphate material and the anode was graphite. Mn based phosphate cathode was prepared from mixing active material with Super P and PVDF in NMP. The mixture slurry was coated on Al foil and vacuum dried at 120° C., and compressed. The total carbon contained in the cathode was 10.6 wt % and the binder content was 10 wt %. The active material loading (excluding residual carbon) was 14 mg/cm². A prismatic cell was constructed with an electrode area of 15 cm² and celgard 2300 was used as separator.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. An electrode active material of the formula $LiMn_{0.8}Fe_{0.1}Al_{0.05}Li_{0.05}PO_4$.

2. An electrochemical cell comprising an electrode active material according to claim 1.

* * * * *

UNITED STATES PATENT AND TRADEMARK OFFICE
CERTIFICATE OF CORRECTION

PATENT NO. : 8,603,367 B2  Page 1 of 1
APPLICATION NO. : 12/887630
DATED : December 10, 2013
INVENTOR(S) : Haitao Huang and M. Yazid Saidi It is certified that error appears in the above-identified patent and that said Letters Patent is hereby corrected as shown below:

In the Specification

Column 3, Line 6
Delete "$0 \leq e \leq 0.5$" Insert --$0 < e < 0.5$--

Signed and Sealed this
Twentieth Day of May, 2014

Michelle K. Lee
*Deputy Director of the United States Patent and Trademark Office*